United States Patent [19]  [11]  4,177,435
Brown  [45]  Dec. 4, 1979

[54] OPTICALLY PUMPED LASER

[75] Inventor: Robert T. Brown, Manchester, Conn.

[73] Assignee: United Technologies Corporation, Hartford, Conn.

[21] Appl. No.: 841,866

[22] Filed: Oct. 13, 1977

[51] Int. Cl.² .................................................. H01S 3/097
[52] U.S. Cl. ........................ 331/94.5 G; 331/94.5 PE
[58] Field of Search .................... 331/94.5 G, 94.5 P, 331/94.5 PE, 94.5 C, 94.5 D; 330/4.3

[56] References Cited

U.S. PATENT DOCUMENTS 4,019,157  4/1977  Hutchinson et al. ............ 331/94.5 G

OTHER PUBLICATIONS

Brown et al., Optically Pumped Electric-discharge UV Laser, Appl. Phys. Lett., vol. 24, No. 5, (Mar. 1, 1974), pp. 236–238.

Primary Examiner—William L. Sikes
Attorney, Agent, or Firm—Lawrence A. Cavanaugh

[57] ABSTRACT

An optically pumped laser system having a configuration capable of efficiently coupling pumping radiation with a gain medium to provide an outlet beam having a wavelength in the ultraviolet and visible spectrum is disclosed. A gain medium including halide, rare and noble gas elements is contained within a cell at total pressures from four to thirty atmospheres. The gain medium is ionized by a spark source within the cell and interacted with optical pumping radiation to provide a diffuse electrical discharge. An optical resonator having the discharge disposed therein efficiently extracts energy from the gain medium to provide an output beam having a wavelength in the visible spectrum when the total pressure of the gain medium is high, typically greater than nine atmospheres and a wavelength in the ultraviolet spectrum when the pressure is moderate, typically less than five atmospheres.

26 Claims, 6 Drawing Figures

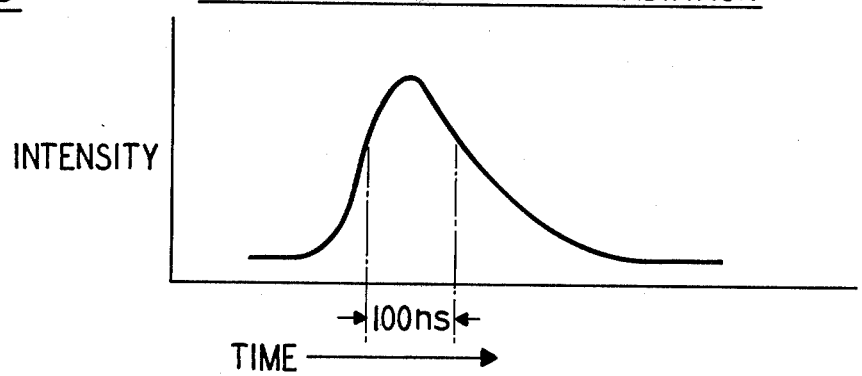
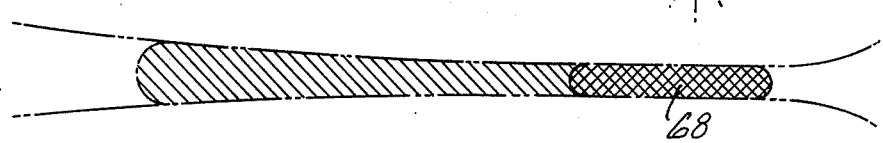
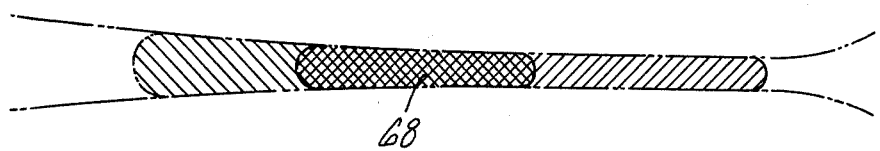
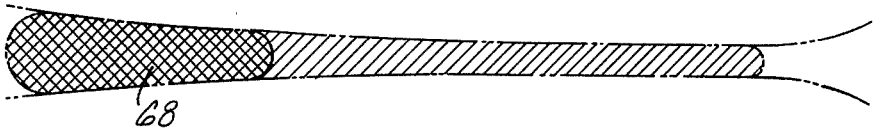

OPTICALLY PUMPED LASER

The invention herein described was made in the course of or under a contract or subcontract thereunder with the Advanced Research Projects Agency.

BACKGROUND OF THE INVENTION

The present invention relates to gas lasers, and more particularly, to an optically pumped laser having a gain medium including at least one halide gas and at least one rare-gas.

Laser systems having gain media including halide and rare-gas elements and utilizing electron beam and/or direct electrical discharge excitation are capable of providing output beams having radiation with wavelengths in the ultraviolet and/or visible spectrum. In the utilization of electron beam excitation, an electron beam is passed through a window of thin metallic foil into a cell containing a gain medium including halide and rare-gas elements, such as xenon, krypton and fluorine. The electron beam is typically passed into the cell along the length of the metal foil transverse to the optical axis. The energy deposited in the gain medium by the interaction of the electron beam with the gas molecules produces a diffuse discharge with a resulting population inversion of the energy levels of the gain medium. An optical cavity, having optical elements bounding the discharge, amplifies the radiation produced by the de-excitation of the energy levels by multiple reflections between the optical elements. A laser beam having a wavelength in the ultraviolet portion of the spectrum is typically out coupled from the cavity by transmission through one of the optical elements. A second electron beam excitation technique employs an electron beam to produce ionization within a cell of a gain medium including halide and rare-gas elements and an electrical field to maintain a diffuse electric discharge within the gain medium to supply the bulk of the input energy. In principle, the second electron beam technique is more efficient than direct electron beam pumping since the discharge conditions can be optimized more effectively.

Direct electrical excitation of a gain medium including halide and rare-gas elements with an electric field to produce a laser beam having a wavelength in the ultraviolet spectrum has also been accomplished. Typically, the gain medium is ionized by an auxiliary ionization source and the electric field provides the energy to maintain the discharge in a self-sustaining mode. Laser systems having gain media including halide and rare-gas elements have the potential for operating with high efficiency with proper excitation. The utilization of electron beam pumping techniques has produced optical emissions having a wavelength of 0.410 microns from an argon/krypton/fluorine gas mixture with a pressure of nine atmospheres.

Prior art devices for producing laser beams from gain media including halide and rare-gas elements have suffered from several serious deficiencies. For the electron beam techniques, the size and complexity of the electron beam system as well as the tendency of the foil window to fail have prevented the development of these systems for practical applications requiring compact, lightweight lasers which can operate at high repetition rates. Additionally, the operation at high pressures have been precluded by the fragileness of the metal foil. On the other hand, while the direct discharge technique is more readily adapted to practical devices, it is severely limited by the tendency of the discharge for form arcs rather than to remain diffuse as required to efficiently extract optical energy from a gain media. This is particularly true for high pressure operations.

SUMMARY OF THE INVENTION

A primary object of the present invention is to provide laser radiation having a wavelength in the ultraviolet and visible spectrum between 0.25 and 0.60 microns.

According to the present invention a laser system providing a beam of output radiation with a wavelength in the ultraviolet and visible spectrum between 0.25 and 0.60 microns comprises, a source of optical radiation for pumping a gain medium having halide and rare-gas elements, containment means for the gain medium, means for passing the gain medium through the containment means, means for ionizing within the containment means at least a portion of the gain medium, means for concentrating pumping radiation into the ionized gas medium to produce a diffuse electric discharge, an optical resonator disposed on and symmetrically about a beam axis with the diffuse electrical discharge being disposed therein, and means for coupling a beam of output radiation from the resonator.

A primary feature of the present invention is the optical pumping of an ionized gain medium having halide, rare and noble gas elements, typically including helium, fluorine and either krypton or xenon plus argon or neon. The gain medium is contained within a cell, having an input window and an output window, capable of accommodating corrosive gases and withstanding very high internal gas pressures. The optical resonator defined at one end by a first mirror positioned within the cell and at the other end by a second mirror is positioned on and symmetrically about the beam axis. A spark source for ionizing the gain medium is located within the cell proximate to the focal plane of a focusing mirror. Additionally, the pumping radiation having a divergent wavefront is concentrated within the resonator to a focal volume having nearly uniform cross-sectional intensity by a focusing mirror having a short focal length. The focusing mirror directs the pumping radiation through the input window, transmissive at the wavelength of the pumping radiation, into the cell to form a cylindrically shaped focal volume axially disposed about the beam axis. The interaction of the optical radiation within the focal volume with the ionized gain medium produces a diffuse electrical discharge, within the resonator, capable of providing a population inversion of the energy states of the gain medium. A diffuser, located within both the resonator and the cell and positioned on and symmetrically about the beam axis, has a reflective surface angularly disposed to the beam axis for reflecting optical radiation diverging from the focal volume, to minimize damage to the exit window and the reflective surfaces of the first and second mirrors by the high intensity of the pumping radiation. A blocking disk located on the beam axis between the focusing mirror and the input window optically shields the first mirror and the inner diameter portion of the exit window from the intensity of the central portion of the pumping radiation.

In one embodiment of the present invention the resonator has the first mirror located within the cell and the second mirror located outside the cell. The exit window provides means for passing output radiation into and out of the cell while maintaining a gas tight enclosure for maintaining the gain medium within the cell. In a further embodiment, a compound exit window has an inner diameter portion transmissive to radiation at the wavelength of the output radiation and an outer diameter portion transmissive at the wavelength of the pumping radiation.

An advantage of the present invention is the efficient coupling of the pumping radiation with the ionized gas medium to produce a diffuse discharge. Additionally, the system is capable of operating at gas pressures of at least fifty atmospheres to produce an output beam having a wavelength in the visible spectrum. Also, the diffuse discharge is generated in a high pressure gain medium without arcing problems. The gain medium optically pumped with radiation having a wavelength in the infrared spectrum from a carbon dioxide or carbon monoxide laser produces an output beam with a wavelength in the ultraviolet and visible spectrum.

The foregoing and other objects, features and advantages of the present invention will become more apparent in the light of the following detailed description of preferred embodiments thereof as discussed and illustrated in the accompanying drawing.

BRIEF DESCRIPTION OF THE DRAWING

FIG. 3 is a view of the pulse shape of a typical pulse of pumping radiation; and FIG. 4 shows the time dependence of the axial position in the focal volume of the plasma produced by the pumping radiation within the cell.

DESCRIPTION OF THE PREFERRED EMBODIMENT

Figure 1:
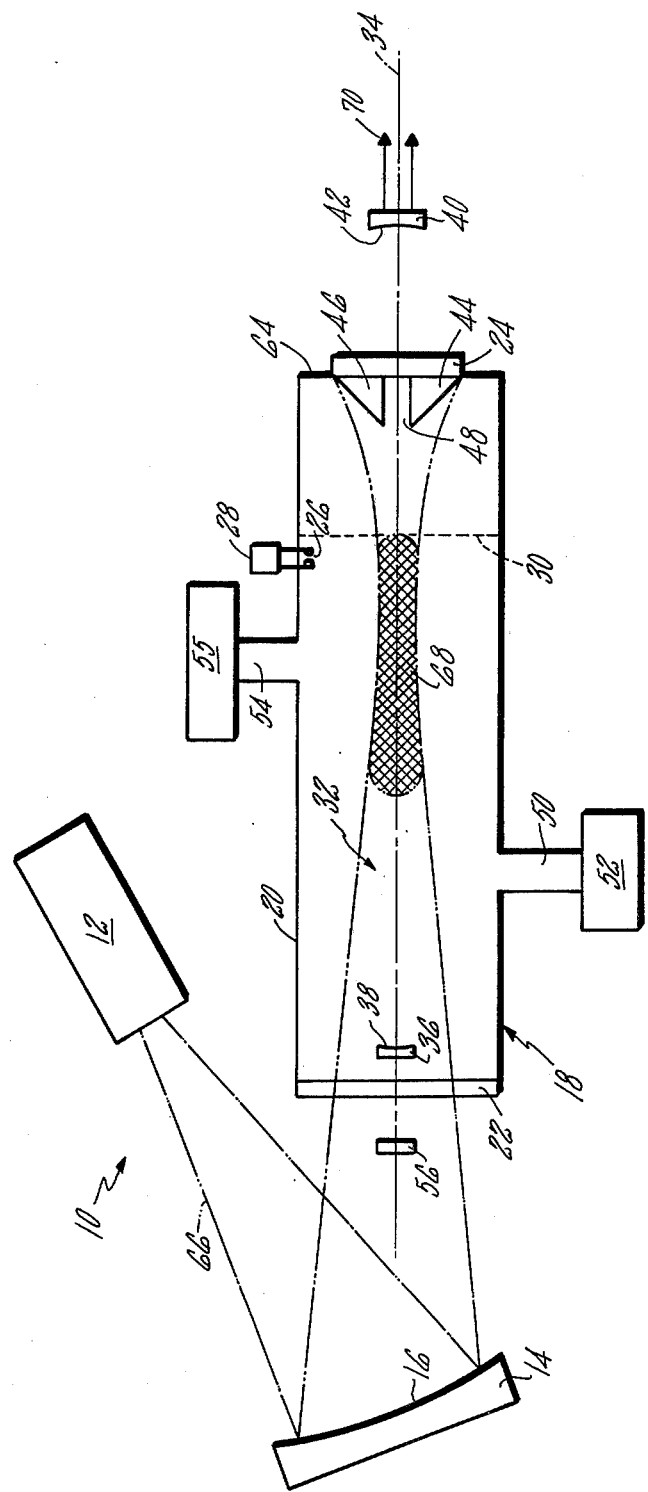
FIG. 1 is a simplified schematic of the present invention showing the principal components.
Figure 2:
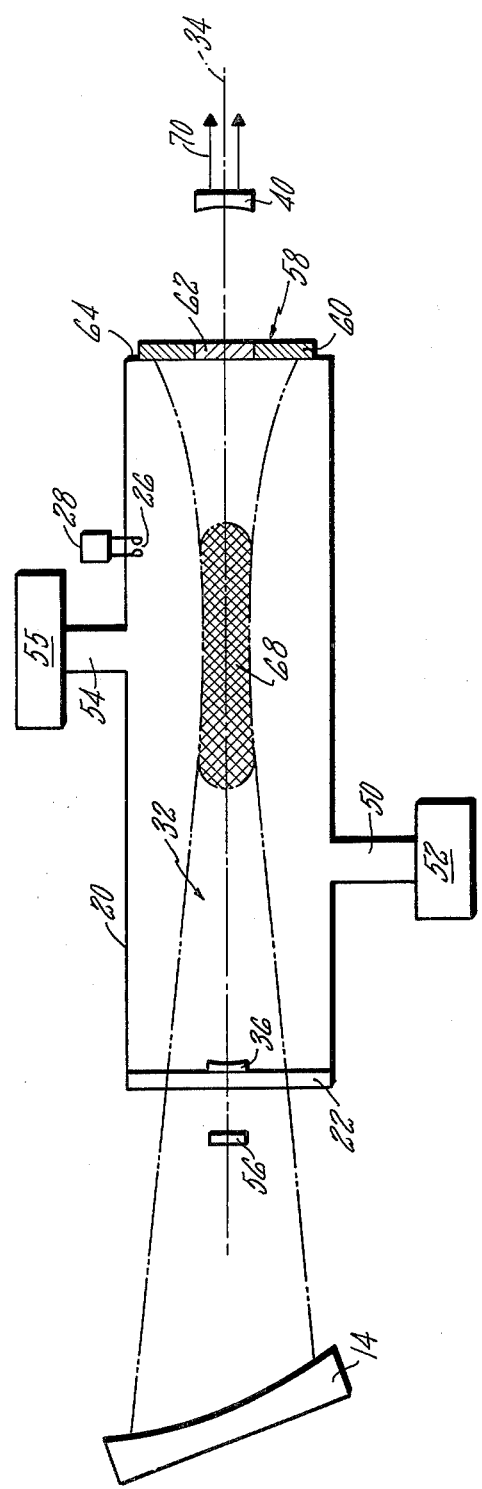
FIG. 2 is a simplified schematic of an embodiment of the present invention.

FIG. 1 shows an optically pumped laser system 10 including a carbon dioxide laser 12, a focusing mirror 14 having a reflective surface 16, a cell 18 having a containment wall 20, an input window 22 attached to one end of the cell and an exit window 24 attached to the other end of the cell. A spark source 26 having an energizer 28 is located within the cell at an axial position proximate to a focal plane 30 of the focusing mirror 14. A resonator 32 located on and symmetrically about a beam axis 34 is defined at one end by a first mirror 36 having a first reflective surface 38 and at the other end by a second mirror 40 having a second reflective surface 42. A diffuser 44 having a reflective surface 46 angularly disposed to the beam axis 34 with an aperture 48 centrally located therein is positioned within the cell in proximity to the exit window 24, with the aperture 48 positioned on and symmetrically about the beam axis 34. Gas inlet pipe 50 is attached at one end to a source 52 of gain medium including halide and rare-gas elements and at the other end to the containment wall 20 of the cell 18.ABs exit pipe 54 is attached at one end to a gas handling system 55 and at the other end to the containment wall 20. A blocking disk 56 is positioned on and about the beam axis 34 exterior to the cell 18 between the input window 22 and the focusing mirror 14. FIG. 2 shows an embodiment of the present invention wherein a compound exit window 58 having an outer diameter portion 60 and an inner diameter portion 62 is attached to the back wall 64 of the cell 18.

The carbon dioxide or carbon monoxide laser 12 is typically constructed with a resonator (not shown) defined at one end by a total reflector having a radius of curvature of two hundred meters and at the other end by an output mirror having a flat reflective surface with a reflectivity of sixty-five percent and adapted for producing pumping radiation 66 having a uniform transverse profile with a beam divergence (full angle) of seven milliradians. The carbon dioxide laser is adapted for producing pumping radiation as pulses having energies typically of 75 joules at pulse lengths typically of one hundred nanosecond (half-width) followed by a 1.5 microsecond tail. In operation, the pumping radiation from the carbon dioxide laser 12 is directed to the focusing mirror 14 and concentrated by the reflective surface 16 into the cell 18, typically constructed with stainless steel, through the input window 22, typically germanium, around the first mirror 36 into the optical resonator 32 to the focal plane 30. The reflective surface 16 on the focusing mirror 14 has a relative short focal length, typically 1.5 meters which is capable of focusing the pumping radiation diverging from the carbon dioxide laser 12 into the cell to a focal volume 68 axially disposed about the beam axis 34. The large diameter beam passing through the input window 22 results in the energy density of the central portion of the beam being sufficiently low so as not to damage the first mirror 36 and the energy density of the outer portion of the beam being sufficiently low so as not to damage the input window. The blocking disk 56 is utilized to eliminate the problem of damage to the input window by radiation reflected from the back surface of the first mirror and incident onto the input window.

A gas mixture including halide and rare-gas elements is passed into the cell from the source 52 through the gas inlet pipe 50 and is passed out of the cell through the gas exit pipe 54 to the gas handling system 55. The gas inlet pipe 50 attached to the source 52 of the gas mixture and the gas handling system 55 are adapted to provide a continuous flow of the gas mixture through the cell 18. Although FIGS. 1 and 2 show a single gas inlet pipe, it is to be recognized that the inlet pipe can be manifolded to provide a uniform flow of the gas mixture through the focal volume. Additionally, the individual gases making up the mixture may be introduced into the cell 18 through independent means with the gas mixing occurring within the cell. The gas exit pipe 54 is attached to a gas handling system such as a vacuum pump for low pressure operation or to a chamber of the like for high pressure operation wherein the pressure differential between the inlet pipe and the exit pipe produces the gas flow.

The gas mixture is preionized to some low level electron density by photoionization from photons generated by the spark source 26, such as a spark plug, energized by the spark energizer 28, typically of the kind well known in the art. The spark source is preferably attached to the containment wall 20 and extends a short distance into the interior of the cell. The intense optical field of the 10.6 micron pumping radiation within the focal volume interacts with the ionized gas mixture and heats the electrons via inverse bremsstrahlung wherein the electron density grows in a cascade process to produce a diffuse and uniform discharge. The diffuse discharge is typically less than 0.01 percent fully ionized resulting in a thermally cool discharge in a gas mixture including helium, fluorine, and krypton or xenon. The discharge has a very fast rise time, typically less than ten nanoseconds. The asymmetric focusing arrangement as shown in FIG. 1 produces a uniform and nearly symmetric discharge about the beam axis 34. The nearly uniform cross-sectional intensity of the pumping radiation within the focal volume interacting with the ionized gas mixture produces a diffuse electrical discharge having a nearly uniform cross-sectional intensity about the beam axis. This produces a nearly uniform gain medium about the beam axis from which ultraviolet/visible radiation can be extracted by the optical resonator.

A pulse of pumping radiation, having the configuration shown in FIG. 3 with a fast rise time, typically of twenty nanosecond duration and having a longer fall time, interacts with the ionized gas mixture to generate a diffuse discharge in the vicinity of the axial position of the spark source. The discharge generates a plasma having a length $L_a$ which moves from the focal plane back toward the source of the pumping radiation as shown in FIG. 4A, B and C. A qualitative explanation of this process can be obtained by looking at the inverse bremsstrahlung absorption length $L_a$ given by the expression $$L_a = \frac{M_e e_o C(W^2 + \nu^2)}{N_e e^2 \nu}$$

Where $M_e$ is electron mass, $e_o$ is the free space permittivity, C is the velocity of light, W is the laser angular frequency, $N_e$ is electron density and $\nu$ is the electron collision frequency. For a given gas mixture and pressure $\nu$ and W are fixed and $L_a$ varies inversely with electron density. Thus, as the intensity of the pumping radiation increases during the pumping pulse, the electron density increases and the absorption length $L_a$ decreases. The absorption length decreases the fastest near the focal plane. At some point during the pumping pulse interval, the absorption length becomes short compared to the length of the focal volume 68 and the plasma shields points within the gas mixture beyond the focus plane from the pumping radiation. As the pumping intensity continues to increase during the pulse, the region of maximum absorption, i.e., the region which has the highest pumping density, sweeps towards the source of pumping radiation as shown in FIG. 4A, B and C. The discharge sweeping effect is critical to the attainment of uniform diffuse discharges in the high pressure gas mixture. This sweeping effect is achieved when the correct combination of gas constituents, gas mixture percentages, total gas pressure, divergence of the pumping radiation, focal length of the focusing mirror, position of the focal volume, shape and intensity of the pumping pulse, and ionization synchronization is used. A typical combination includes a seven milliradian divergence of the pumping radiation and a 1.5 meter focal length of the focusing mirror which results in a focal volume having a length of twenty-five to thirty centimeters and a focal diameter of one centimeter in gas mixtures including volume percentages of 0.01 to 0.06 percent fluorine, 0.06 to 0.5 percent krypton or xenon and approximately ninety-nine percent helium with total pressures varying between four to thirty atmospheres, a pulse duration of one hundred nanoseconds at half width with a twenty nanosecond rise time, a synchronization delay between the ionization pulse and the pulse of pumping radiation of approximately 0.5 microseconds and a peak pumping intensity at the focal volume of $3 \times 10^8$ watts/cm$^2$. In addition, one to five percent argon or neon may be added to enhance the population inversion within the gain medium with the percentage of helium being reduced.

A discharge in the gain medium at a pressure of seventeen atmospheres produces an electron temperature of two electron volts with an electron density of $1.4 \times 10^{16}$ centimeters $^{-3}$ resulting in an absorption length of one centimeter. The plasma sweeps through the active volume of the resonator with a characteristic absorption length of approximately one centimeter. This makes the discharge relatively insensitive to nonuniformities and less likely to suffer from arcing within the discharge, a condition common to discharges in electronegative gases. This discharge is ideally suited to pumping energy levels capable of producing fluorescence at 0.410 microns from a krypton fluorine mixture. An output beam having a wavelength of substantially 0.410 microns is generated with a mixture containing krypton and fluorine, when the total gas pressure of the gain medium is high, typically greater than nine atmospheres and a wavelength of substantially 0.248 microns when the gas pressure is moderate, typically less than five atmospheres. An output beam having a wavelength of substantially 0.354 microns is obtained for a mixture containing xenon and fluorine at a total pressure greater than nine atmospheres.

The reflective surface 38 on the first mirror 36 is a dielectric coating on a fused silica substrate capable of totally reflecting ultraviolet/visible radiation resulting from the decay of the energy levels populated by the optically induced discharge within the resonator 32. The second mirror 40 formed of material transparent at the wavelength of ultraviolet and visible radiation, such as quartz, has a partially reflective surface 42 and is located on and symmetrically about the beam axis 34 outside the cell. Locating the second mirror outside the cell isolates the second mirror from the corrosive gas mixture within the cell thereby inhibiting damage to the mirror or to the reflective coating typically applied to form the reflective surface 42. Ultraviolet/visible radiation amplified within the resonator 32 by multiple reflections between the first mirror and the second mirror repeatedly pass in and out of the cell 18 through the exit window 24. The exit window is made of material having a high transmissitivity for radiation with wavelengths in the ultraviolet and visible spectrum such as quartz and is attached to the cell with the use of viton O-rings. The exit window is securely attached to the back wall 64 to withstand high internal pressures in cell, typically at least fifty atmospheres, and the exit window material and attachment means must not be affected by the corrosive gases within the cell. An output beam 70 is coupled out of the resonator through the second mirror 40. It is to be recognized that the output beam can also be coupled out of the resonator through an aperture within the second mirror or can be diffractively out coupled around the outer diameter of the second mirror. For both of the latter methods of coupling an output beam from the resonator, the reflective surface 42 of the output coupler would be totally reflective at the wavelength of the output beam.

A diffuser 44 having a reflective surface 46 angularly disposed to the beam axis 34 and an aperture 48 centrally located therein is attached to the inside surface of the back wall 64 with the aperture positioned on and symmetrically about the beam axis 34. In operation, the pumping radiation is concentrated into the focal volume 68 by the focusing mirror 14 and typically at least ninety percent of the pumping radiation is absorbed by the ionized gas mixture to generate the diffuse discharge. The portion of the pumping radiation not absorbed by the ionized gas expands upon passing through the focal volume and is incident onto the diffuser 44. Since the first mirror 36 and the blocking disk 56 intercept the central portion of the pumping radiation focused into the cell, essentially all of the radiation expanding from the focal volume is incident onto the reflective surfaces 46 of the diffuser 44 with a minimum intensity of pumping radiation incident into the aperture of the diffuser. The reflective surface 46 reflects the pumping radiation incident thereon to the containment wall where it is absorbed. The aperture 48 has a diameter sized to optimize the diameter of the ultraviolet/visible radiation resonating within the resonator 32 while minimizing the intensity of pumping radiation incident on the exit window. High intensity pumping radiation incident onto the exit window typically will result in damage to the window.

The pumping geometry as shown in FIGS. 1 and 2 allows the incorporation of an efficient ultraviolet/visible resonator 32 enclosing the optically pumped discharge. By using a high divergence pumping beam, a relative long focal volume is obtained with a short focal length focusing mirror. Because of the resulting shape of the focal volume and the nearly uniform cross-sectional intensity of the pumping radiation within the focal volume, the optical components defining the resonator can be located physically close to the discharge to efficiently extract energy therefrom without blocking a large fraction of the beam and without being damaged by the pumping radiation. This in turn reduces the round trip transit time of the ultraviolet/visible photons within the resonator and allows the ultraviolet/visible radiation field to reach saturation in a time scale short compared to the pumping pulse length. The net effect is improved overall efficiency of operation.

Since all of the pumping radiation focused into the focal zone within the cell is not absorbed by the discharge, the cell is designed to prevent pumping radiation transmitted through the discharge from striking the front surface of the exit window and damaging it. The diffuser 44 as shown in FIG. 1 effectively minimizes the intensity of the pumping radiation incident onto the exit window 24. In FIG. 2 an embodiment of the present invention is shown wherein the pumping radiation passing through the focal volume is incident onto a compound exit window 58 having an inner diameter portion 62 adapted to transmit ultraviolet and visible radiation and an outer diameter portion 60 capable of transmitting the pumping radiation directly out of the cell which effectively reduces damage to the optical components of the laser from reflections of the pumping radiation within the cell.

While this invention has been described in a preferred embodiment it would be apparent for those skilled in the art that various modifications may be made to the apparatus without departing from the scope of the invention as hereinafter claimed.

Having thus described a typical embodiment of my invention that which I claim as new and desire to secure by Letters Patent of the United States is:

1. An electrical discharge laser comprising:
    a source of pumping radiation for creating a population inversion in a gaseous gain medium;
    a gain medium comprising at least one of the rare gases and at least one of the halide gases;
    a cell for containment of the gain medium wherein the cell includes an input window substantially transmissive at the wavelength of the pumping radiation and an exit window which is substantially transmissive at the ultraviolet and visible wavelengths between 0.25 and 0.60 microns wherein the input window and exit window are positioned on a beam axis;
    means for passing the gain medium through the cell;
    ionization means for creating a low level of electron density in at least some of the gain medium in the cell;
    means for concentrating the pumping radiation into a volume occupied by ionized gain medium to produce a diffuse electrical discharge;
    an optical resonator positioned on and symmetrically about the beam axis having a first mirror with a first reflective surface and a second mirror with a second reflective surface wherein the diffuse electrical discharge is disposed therebetween;
    means for shielding the first mirror, the second mirror and the exit window from the pumping radiation; and
    means for coupling a beam of output radiation from the resonator.

2. The invention in accordance with claim 1 wherein the gain medium includes helium, krypton and flourine.

3. The invention in accordance with claim 2 further including either argon or neon.

4. The invention in accordance with claim 1 wherein the gain medium includes helium, xenon and fluorine.

5. The invention in accordance with claim 4 further including either argon or neon.

6. The invention in accordance with claim 1 wherein the means for shielding the first mirror and second mirror is a diffuser positioned on and symmetrically about the beam axis having a reflective surface angularly disposed to the beam axis with an aperture centrally located therein wherein the second reflective surface of the second mirror is in line of sight optical communication with the first reflective surface of the first mirror through the aperture in the diffuser.

7. The invention in accordance with claim 6 further including a blocking disk positioned on the beam axis between the means for concentrating the pumping radiation and the input window.

8. The invention in accordance with claim 1 wherein the exit window has an outer diameter portion substantially transmissive at the wavelength of the pumping radiation and an inner diameter portion substantially transmissive at the wavelength of the output radiation.

9. The invention in accordance with claim 1 wherein the source of pumping radiation is a carbon dioxide laser.

10. The invention in accordance with claim 1 wherein the source of pumping radiation is a carbon monoxide laser.

11. The invention in accordance with claim 1 wherein the means for concentrating the pumping radiation is positioned on the beam axis.

12. The invention in accordance with claim 11 wherein the means for concentrating the pumping radiation is a focusing mirror adapted for focusing the pumping radiation into a substantially cylindrically shaped focal volume axially disposed about the beam axis and having a nearly uniform cross-sectional intensity within the focal volume.

13. The invention in accordance with claim 1 wherein the first mirror of the optical resonator is located within the cell and the second mirror is located outside the cell with the exit window positioned between the first and second mirrors.

14. A method of optically pumping an electrical discharge laser comprising the steps of:
providing pumping radiation for creating a population inversion in a gaseous gain medium;
passing a gaseous gain medium, including at least one of the rare-gases and at least one of the halide gases, through a cell located on a beam axis and adapted for containing the gain medium;
ionizing at least some of the gain medium within the cell to create a low level of electron density about the beam axis;
concentrating the pumping radiation through an input window in the cell into a volume occupied by the low level of electron density to produce a diffuse electrical discharge within the gain medium;
stimulating emission of output radiation from the population inversion of energy states produced by the diffuse electrical discharge within the gain medium with an optical resonator having a first and second mirror located on the beam axis wherein the diffuse electrical discharge is disposed therebetween;
passing the output radiation out of the cell through an exit window located on the beam axis;
shielding the exit window and the first and second mirrors of the optical resonator from the pumping radiation; and
coupling an output beam out of the resonator.

15. The invention in accordance with claim 14 further including controlling the intensity of the pumping radiation passing through the input window in the cell to provide a diffuse electrical discharge within the gain medium which is less than 0.01 percent ionized.

16. The invention in accordance with claim 14 wherein the output beam is coupled out of the optical resonator by transmission through the second mirror.

17. The invention in accordance with claim 14 wherein the pumping radiation is produced by a carbon dioxide laser.

18. The invention in accordance with claim 17 further including controlling the pressure of the gain medium within the cell to produce an output beam having a wavelength variable between 0.25 and 0.60 microns.

19. The invention in accordance with claim 14 wherein the pumping radiation is concentrated into the cell substantially about the beam axis.

20. The invention in accordance with claim 19 wherein the pumping radiation is concentrated to a substantially cylindrically shaped focal volume axially disposed about the beam axis and having a nearly uniform cross-sectional intensity within the focal volume.

21. The invention in accordance with claim 14 wherein the gain medium includes helium, krypton or xenon and fluorine.

22. The invention in accordance with claim 21 wherein the gain medium is maintained within the cell at a total pressure variable between four and thirty atmospheres and includes volume percentages of 0.01 to 0.06 percent fluorine, 0.06 to 0.5 percent krypton and substantially ninety-nine percent helium.

23. The invention in accordance with claim 21 wherein the gain medium is maintained within the cell at a total pressure variable between four and thirty atmospheres and includes volume percentages of 0.01 to 0.06 percent fluorine, 0.06 to 0.5 percent xenon and substantially ninety-nine percent helium.

24. The invention in accordance with claim 21 further including either argon or neon.

25. The invention in accordance with claim 24 wherein the gain medium is mantained within the cell at a total pressure variable between four and thirty atmospheres and includes volume percentages of 0.01 to 0.06 percent fluorine, 0.06 to 0.5 percent krypton, one to five percent argon or neon and substantially ninety-four to ninety-eight percent helium.

26. The invention in accordance with claim 24 wherein the gain medium is maintained within the cell at a total pressure variable between four and thirty atmospheres and includes volume percentages of 0.01 to 0.06 percent fluorine, 0.06 to 0.5 percent xenon, one to five percent argon or neon and substantially ninety-four to ninety-eight percent helium.

* * * * *